Figure 4:
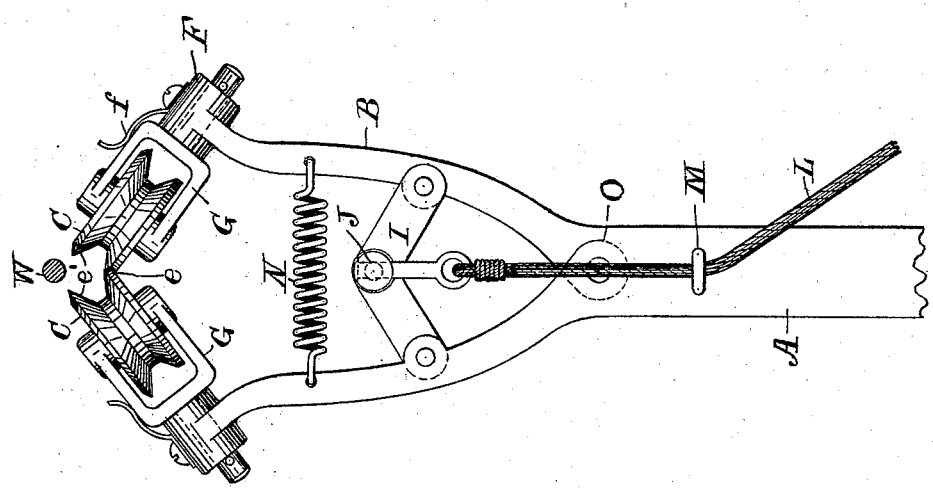

(No Model.) 2 Sheets—Sheet 1.
T. THOMPSON.
TROLLEY POLE WITH LOCKING WHEELS.
No. 540,340. Patented June 4, 1895.
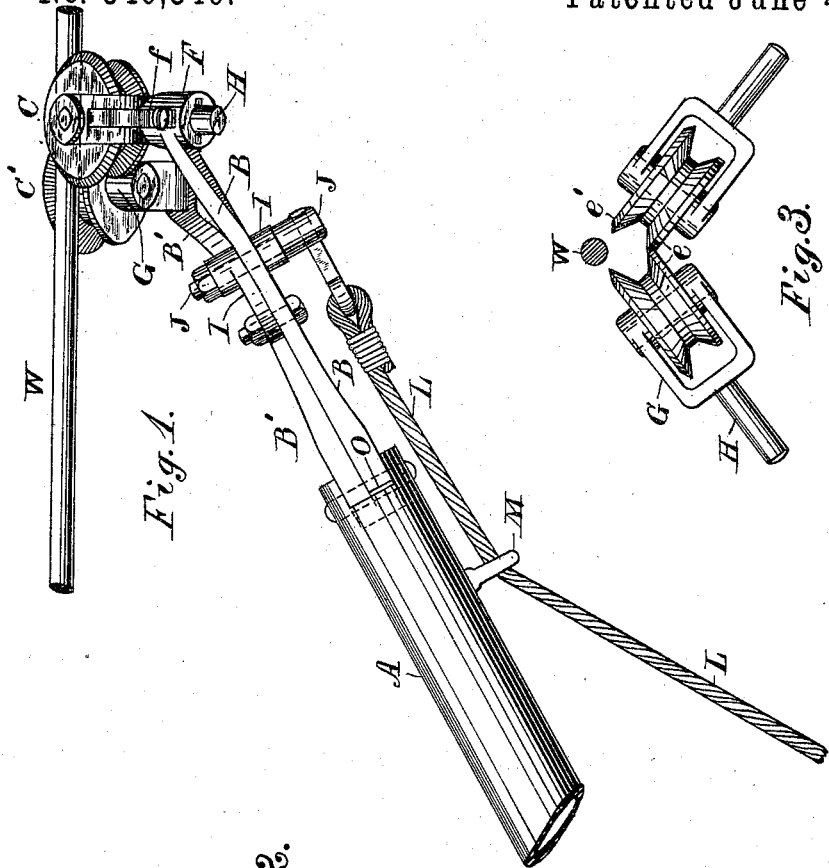
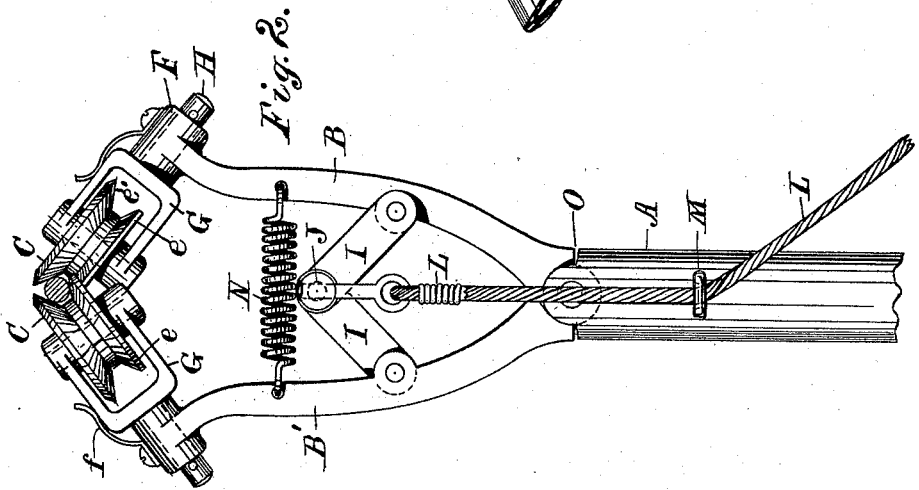
Attest:
Edw. F. Kinsey
Jacob Marx
Inventor.
Thomas Thompson, per
Thomas S. Crane, Atty.

(No Model.)  2 Sheets—Sheet 2.

T. THOMPSON.
TROLLEY POLE WITH LOCKING WHEELS.

No. 540,340. Patented June 4, 1895.

Attest:
L. Lee,
Edw. P. Kinsey.

Inventor.
Thomas Thompson,
per Thomas F. Crane, Atty.

UNITED STATES PATENT OFFICE.

THOMAS THOMPSON, OF NEWARK, NEW JERSEY.

TROLLEY-POLE WITH LOCKING-WHEELS.

SPECIFICATION forming part of Letters Patent No. 540,340, dated June 4, 1895.

Application filed October 29, 1894. Serial No. 527,231. (No model.)

*To all whom it may concern:*

Be it known that I, THOMAS THOMPSON, a citizen of the United States, residing at Newark, Essex county, New Jersey, have invented certain new and useful Improvements in Trolley-Poles with Locking-Wheels, fully described and represented in the following specification and the accompanying drawings, forming a part of the same.

The object of this invention is to furnish a trolley pole with wheels adapted to grasp the opposite sides of a trolley wire which is attached to its supports upon its upper side. With most of the trolleys at present in use, a single wheel is used to take the electric current therefrom, and an excessive pressure is required to hold the wheel in contact with the wire, as such pressure is required to overcome the inertia of the pole with the utmost quickness if the pole is vibrated by the unevenness of the railroad track. The springs employed to press the pole upward are therefore made a great deal stronger than is necessary to balance the weight of the trolley pole and produce the desired electrical contact. Such excessive pressure of the springs produces a needless pressure upon the wire, the rim of the wheel, and its journal, thus wearing out the wire, the exterior of the wheel, and its journal, at a very unnecessary rate.

In the present invention, I provide the arm of the trolley pole with a movable carrier, and mount two flanged trolley wheels upon the arm and the carrier in an inclined position, so as to embrace the trolley wire upon its opposite lower quarters. One of the trolley wheels is supported in advance of the other, and the lower or inner flanges of the wheels may thus be made of sufficient diameter to extend across the bottom of the trolley wire when the wheels are closed thereon. The lower flanges thus serve to maintain a closed bottom for the groove, when the wheels are separated to admit the trolley wire. The upper or outer flanges of the wheels are formed of faces inclined toward one another, so that when embracing the wire they tend to support the trolley thereon, and the grasp of the wheels upon the wire is thus sufficient to effectually support the pole arm and maintain the contact of the wheels with the wire during the oscillations of the car. By such construction, the balancing springs can be made very much lighter, the pressure of the wheels upon the wire can be greatly reduced, and the durability of all the wearing surfaces thus greatly extended. The carrier is shown in the drawings as a bar pivoted to the arm of the pole adjacent to its upper end, but any other form of movable carrier may be used, which is adapted to afford a lateral movement to the wheel in releasing the wire.

Two forms of my invention are illustrated in the annexed drawings, in which—

Figure 1 is a side elevation of the trolley-pole with a portion of the wire. Fig. 2 is an end elevation of the head of the pole with the wheels both carried upon jointed bars and pressed upon the trolley-wire. Fig. 3 is a diagram of the trolley-wheel separated. Fig. 4 is an elevation like Fig. 2, with one wheel only mounted upon a jointed bar and the wheels separated to admit the wire.

In Figs. 1 and 2, A is the arm of the pole having bars B, B′, pivoted thereto at its upper end, each carrying one of the trolley wheels C, C′. The wheels are shown arranged obliquely each at an angle of about fifty degrees with a vertical line through the wire W, and flanges $e$ and $e'$ are formed upon the wheels to embrace the lower side of the wire and its upper quarters. The upper ends of the bars B, B′, are provided each with a socket F at the outer side of the trolley wheel, at right angles to its pivot, and each wheel is mounted in a forked holder G having a shank H fitted to turn in the socket F. A leaf spring $f$ is attached to the socket F and pressed upon the flat side of the holder G, to hold it normally in a suitable position to fit upon the wire; but adapted to yield if the holder is pressed by the trolley wheel into any other position. Intermediate to their ends, the bars are hinged to toggle links I which are connected by a bolt J, to the head of which is attached a cord L. An eye M is provided upon the side of the arm A, and the cord L is passed through the same, and in practice is extended within reach of the car conductor. A pull upon the cord operates, by straightening the toggle links, to separate the bars B, B′, and to thus withdraw the wheels from the trolley wire. A spring N is provided to draw the bars B, B′, normally together, thus pressing the wheels upon opposite sides of the trolley wire, and holding them in elastic contact therewith.

The bearing face of the upper flange e' of each wheel is not curved or hollowed, but inclined upwardly and inwardly, and the pressure of the wheels upon opposite sides of the wire thus tends to crowd the wheels upward, and thus support the weight of both wheels and the attached trolley arm. The lower flanges e of the wheels are proportioned to extend considerably past the center of the wire upon its lower side, when the upper flanges are in contact therewith. The bars B, B', are formed to support the wheel c in advance of the wheel c', thus permitting the lower flanges e to extend across the bottom of the wire without interference from one another, when the upper flanges are pressed upon the wire.

Owing to the oblique arrangement of the wheels, the upper flanges e' may be made larger in diameter than the flanges e, without reaching the center line of the wire; thus adapting the upper flanges to contact readily with the wire clip or any other obstruction, and to yield laterally in its passage over the same, or through switches.

Shoulders O are shown upon the hinged joints of the arms B, B', to limit their outward movement; and the effect of the toggles in separating the wheels may thus be fixed at any desired limit.

The extension of the cord L through the eye M upon the arm of the trolley pole operates when the cord is pulled to first straighten the toggle and thus separate the trolley wheels, and second, to pull the trolley pole downward and thus remove the wheels from proximity to the wire. The operation of detaching the wheels from the wire is thus automatically effected in the act of lowering the pole whenever it is necessary to shift the same.

In Fig. 4 only one of the trolley wheels is mounted upon a pivoted bar or carrier, the other arm being attached rigidly to the pole A, while the other constructive features are the same as in Fig. 2. In this view, the trolley wheels are shown separated, as in Fig. 3, in readiness for application to the wire. It will be noticed that the lower flanges are held wholly free from contact with one another, and that the movement of the wheels toward one another is limited wholly by the pressure and contact with the wire of the inwardly inclined faces of the upper flanges e'. The trolley wheels are thus locked upon the arm with sufficient force to hold the same in continuous contact therewith, when the car is oscillated by moving over an uneven track, and the device thus avoids the use of excessive spring tension to press the arm upward; while it also avoids the slippage of the wheel from the wire, and the loss of current or sparking produced thereby.

Figs. 3 and 4 show the wheels separated in the necessary degree to release the wire, or to apply the wheels to the wire when required; and when in such relation, it will be noticed that the upper flanges e' (although larger than the lower flanges e) are, by the oblique position of the wheels, separated sufficiently to effect these objects, while the lower flanges still operate to close the bottom of the space between the rims of the wheels.

By my construction, the upper or outer flanges of the trolley wheels exert constantly an elastic pressure upon the sides of the trolley wire above the center line, and thus maintain a contact independent of that which may be produced upon the under side of the wire by the lower flanges.

It will be noticed that in my construction the rim of the wheel is not formed with a round groove, but that the flanges, in section, present straight line bearing-surfaces to the wire. The bottom of the groove in the rim of each trolley wheel is also much narrower than the diameter of the wire, so that the wire is wedged between the upper and lower flanges of each wheel by the pressure of the wheel thereon. The inward inclination of the upper or outer flanges thus produces an upward pressure of the lower flanges and maintains a contact of such flanges with the bottom of the wire independent of any upward pressure exerted by the pole.

Inclined trolley wheels have been pressed exactly opposite one another toward a trolley wire; but in such case the groove within the wheels has been made so large as to wholly avoid any contact with the wire upon its sides or upper quarters, and the lower flanges being exactly opposite one another, could not project beyond the center of the wire, or form any bottom for the groove when the wheels are separated. By making the bottom of the groove smaller than the wire, as in my construction, and suitably projecting the lower flanges, while inclining the bearing surface of the upper flanges inwardly, I am enabled to grasp the wire upon its upper quarters while also making contact with its lower side, and thus maintain a continuous contact of the wheels during any vibrations of the pole or wire. I also secure a substantially closed bottom for the groove when the wheels are separated sufficiently to admit the wire.

Having thus set forth the nature of the invention, what is claimed herein is—

1. In a trolley pole, the combination, with a suitable arm, of trolley wheels set one in advance of the other and inclined toward the lower quarters of the trolley wire with their lower flanges proportioned to project sufficiently past the center of the wire upon its lower side, when pressed thereon, to close the bottom of the space between the rims of the wheels when separated for application to the wire, substantially as herein set forth.

2. In a trolley pole, the combination, with a suitable arm, of trolley wheels set one in advance of the other and inclined toward the lower quarters of the trolley wire, the wheels having grooves smaller in the bottom than the wire and the lower flanges proportioned to project sufficiently past the center of the wire upon its lower side, when pressed thereon, to close the bottom of the space between the rims of the wheels when separated for application to the wire, as and for the purpose set forth.

3. In a trolley pole, the combination, with a suitable arm, of trolley wheels set one in advance of the other and inclined toward the lower quarters of the trolley wire, the wheels having grooves smaller in the bottom than the wire, with upper flange having bearing-faces inclined inwardly and upwardly to contact with the upper quarters of the wire, and lower flanges proportioned to project considerably past the center of the wire upon its lower side when the flanges are pressed toward the wire, substantially as herein set forth.

4. In a trolley pole, the combination, with the arm having a wheel carrier movable laterally thereon, of trolley wheels mounted obliquely upon the arm and the wheel carrier one in advance of the other, means for pressing the wheels together, the eye M upon the arm, and a cord extended through the eye and provided with suitable means for retracting the carrier, substantially as set forth.

5. In a trolley pole, the combination, with the arm having a bar pivoted thereto near the end, of trolley wheels mounted obliquely upon the arm and the bar one in advance of the other, a spring for moving the bar toward the arm, and toggle links connecting the bar and arm, with a cord attached to the joint of the toggle links to actuate the same, as herein set forth.

6. In a trolley pole, the combination, with the arm having a bar pivoted thereto near the end, of trolley wheels mounted obliquely upon the arm and the bar one in advance of the other, a spring for pressing the wheels together, a stop to regulate the separation of the wheels, a cord with suitable means for separating the arm and bar, and the wheels being provided with lower flanges adapted to close the bottom of the space between the rims of the wheels when separated, substantially as herein set forth.

7. In a trolley pole, the combination, with the arm having a bar pivoted thereto near the end, of trolley wheels mounted obliquely upon the arm and the bar one in advance of the other, a spring for pressing the wheels together, the shoulder O upon the hinged joint of the arm B to regulate the separation of the arm and bar, toggle links connecting the bar and arm, the eye M upon the arm, and a cord attached to the joint of the toggle links and extended through the eye, and the wheels being provided with lower flanges adapted to close the bottom of the space between the rims of the wheels when separated, substantially as herein set forth.

In testimony whereof I have hereunto set my hand in the presence of two subscribing witnesses.

THOMAS THOMPSON.

Witnesses:
THOMAS S. CRANE,
JOHN N. LEARY.